United States Patent
Hamanaka

(10) Patent No.: US 10,038,194 B2
(45) Date of Patent: Jul. 31, 2018

(54) NEGATIVE ELECTRODE, METHOD FOR PRODUCING THE SAME, AND BATTERY

(71) Applicant: NEC ENERGY DEVICES, LTD., Sagamihara-shi, Kanagawa (JP)

(72) Inventor: Nobuaki Hamanaka, Kanagawa (JP)

(73) Assignee: NEC ENERGY DEVICES, LTD., Sagamihara-shi, Kanagawa (JP)

( * ) Notice: Subject to any disclaimer, the term of this patent is extended or adjusted under 35 U.S.C. 154(b) by 47 days.

(21) Appl. No.: 14/912,999

(22) PCT Filed: Jul. 17, 2014

(86) PCT No.: PCT/JP2014/069061
§ 371 (c)(1),
(2) Date: Feb. 19, 2016

(87) PCT Pub. No.: WO2015/025650
PCT Pub. Date: Feb. 26, 2015

(65) Prior Publication Data
US 2016/0211525 A1    Jul. 21, 2016

(30) Foreign Application Priority Data

Aug. 22, 2013  (JP) ................ 2013-172043

(51) Int. Cl.
*H01M 4/02*   (2006.01)
*H01M 4/62*   (2006.01)
(Continued)

(52) U.S. Cl.
CPC ......... *H01M 4/628* (2013.01); *H01M 4/0404* (2013.01); *H01M 4/0471* (2013.01);
(Continued)

(58) Field of Classification Search
CPC ...................................................... H01M 4/00
See application file for complete search history.

(56) References Cited

U.S. PATENT DOCUMENTS

2013/0189602 A1* 7/2013 Lahiri ................... H01M 4/134
429/452

FOREIGN PATENT DOCUMENTS

JP    2002-190298 A   7/2002
JP    2002-237294 A   8/2002
(Continued)

OTHER PUBLICATIONS

International Search Report for PCT/JP2014/069061 dated Aug. 19, 2014 [PCT/ISA/210].

(Continued)

*Primary Examiner* — Jacob Marks
(74) *Attorney, Agent, or Firm* — Sughrue Mion, PLLC

(57) ABSTRACT

A method for producing a negative electrode, including a step of subjecting a copper foil to a plasma treatment, a step of coating the copper foil subjected to the plasma treatment, with a slurry including an active material containing a silicon atom, and a step of subjecting the copper foil coated with the slurry to a heat treatment to form an intermetallic compound of copper and silicon at an interface between the copper foil and the active material. A negative electrode including a copper foil, an active material layer including an active material containing a silicon atom on the copper foil, and copper silicide at an interface between the copper foil and the active material.

20 Claims, 1 Drawing Sheet

(51) Int. Cl.
*H01M 4/134* (2010.01)
*H01M 4/1395* (2010.01)
*H01M 4/04* (2006.01)
*H01M 4/38* (2006.01)
*H01M 4/66* (2006.01)
*H01M 4/36* (2006.01)
*H01M 10/0525* (2010.01)
*H01M 10/052* (2010.01)

(52) U.S. Cl.
CPC ......... *H01M 4/134* (2013.01); *H01M 4/1395* (2013.01); *H01M 4/366* (2013.01); *H01M 4/386* (2013.01); *H01M 4/661* (2013.01); *H01M 4/667* (2013.01); *H01M 10/0525* (2013.01); *H01M 10/052* (2013.01); *H01M 2004/027* (2013.01)

(56) References Cited

FOREIGN PATENT DOCUMENTS

| | | | |
|---|---|---|---|
| JP | 2004-207113 A | | 7/2004 |
| JP | 2004-311331 A | | 11/2004 |
| JP | 2005-26203 A | | 1/2005 |
| JP | 2006-004634 | * | 1/2006 |
| JP | 2009-130369 A | | 6/2009 |
| WO | 01/031721 A1 | | 5/2001 |
| WO | 2013/021640 A1 | | 2/2013 |

OTHER PUBLICATIONS

Written Opinion for PCT/JP2014/069061 dated Aug. 19, 2014 [PCT/ISA/237].

* cited by examiner

NEGATIVE ELECTRODE, METHOD FOR PRODUCING THE SAME, AND BATTERY

CROSS REFERENCE TO RELATED APPLICATIONS

This application is a National Stage of International Application No. PCT/JP2014/069061, filed on Jul. 17, 2014, which claims priority from Japanese Patent Application No. 2013-172043, filed on Aug. 22, 2013, the contents of all of which are incorporated herein by reference in their entirety.

TECHNICAL FIELD

The present invention relates to a negative electrode, a method for producing the same, and a battery.

BACKGROUND ART

In recent years, with the widespread use of a mobile device such as a mobile phone and a notebook computer, the role of a secondary battery serving as a source of power thereof has been of importance. Such a secondary battery is demanded to be small and light, and to have the performances of having a high capacity and being hardly degraded even in repeating charge-discharge. Currently, a lithium ion secondary battery is most frequently used as the secondary battery.

Carbon such as graphite and hard carbon is mainly used for the negative electrode of the lithium ion secondary battery. While carbon can allow a charge-discharge cycle to be favorably repeated, it is used in a capacity that has already reached around the theoretical capacity, and therefore a significant increase in capacity cannot be expected hereafter. On the other hand, the lithium ion secondary battery is strongly demanded to have an enhanced capacity, and a negative electrode material is studied which has a higher capacity, namely, a higher energy density than carbon.

Now, silicon as a negative electrode material that can achieve a high energy density is exemplified. Non Patent Literature 1 describes the use of silicon as the negative electrode active material. The negative electrode in which silicon is used as the negative electrode active material is large in the amount of a lithium ion to be stored and released per unit volume and has a high capacity, but the negative electrode active material by itself is considerably expanded and contracted in storage/release of the lithium ion. Therefore, pulverization of the negative electrode active material proceeds. Thus, there is a problem of separation between the negative electrode active material and a foil as a negative electrode current collector. Accordingly, there is also caused problems of an increase in electrode resistance and of a decrease in charge-discharge cycle life.

In order to solve such problems, Patent Literatures 1 and 2 disclose a technique of diffusing an active material in a current collector to form a solid solution.

In addition, Patent Literature 3 discloses a negative electrode in which a negative electrode active material layer, which forms an alloy at an interface with a negative electrode current collector having a protrusion and which includes at least one of elemental silicon and a silicon compound, is provided on the negative electrode current collector.

CITATION LIST

Patent Literatures

Patent Literature 1: WO2001/031721
Patent Literature 2: JP2002-190298A
Patent Literature 3: JP2004-207113A Non Patent Literature Non Patent Literature 1: Li et al. (and other 4 persons), "A High Capacity Nano-Si Composite Anode Material for Lithium Rechargeable Batteries", Electrochemical and Solid-State Letters, Vol. 2, No. 11, p 547-549 (1999)

SUMMARY OF INVENTION

Technical Problem

However, there was a concern that the use of the techniques described in Patent Literatures 1 and 2 causes a problem of curving in cell assembling after coating due to strain generated on a foil because the active material is diffused to the foil.

In addition, in the technique described in Patent Literature 3, the negative electrode active material layer is formed by deposition, sintering, coating and the like, and therefore the volume of the negative electrode active material layer is expanded and contracted due to intercalation and deintercalation of lithium. Consequently, shearing stress is also applied to a binder that binds a negative electrode active material and the negative electrode current collector (foil), and the negative electrode active material is finally peeled from the negative electrode current collector. Thus, the technique described in Patent Literature 3 has a problem of insufficient adhesion between the negative electrode current collector and the negative electrode current collector layer.

In particular, strong interaction does not occur between copper and silicon and the adhesiveness therebetween is low, and therefore the above problem is remarkable in the case of formation of a layer of a negative electrode active material containing silicon on a copper foil. That is, an electrode, in which the negative electrode active material containing silicon is formed on the copper foil as the negative electrode current collector, is poor in adhesion between the negative electrode current collector and the negative electrode active material, and therefore is remarkably increased in electrode resistance to result in deterioration in discharge capacity at an initial stage of a charge-discharge cycle.

An object of the present invention is to provide a negative electrode in which the deterioration in discharge capacity at an initial stage of a charge-discharge cycle due to an increase in electrode resistance described above is prevented, as well as a method for producing the negative electrode, and a battery.

Solution to Problem

One exemplary embodiment relates to a method for producing a negative electrode, including:
subjecting a copper foil to a plasma treatment,
coating the copper foil subjected to the plasma treatment, with a slurry including an active material containing a silicon atom, and
subjecting the copper foil coated with the slurry to a heat treatment to form an intermetallic compound of copper and silicon at an interface between the copper foil and the active material.

Another exemplary embodiment relates to a negative electrode including
a copper foil,
an active material layer including an active material containing a silicon atom on the copper foil, and
copper silicide at an interface between the copper foil and the active material.

Advantageous Effect of Invention

It is possible to suppress an increase in electrode resistance to prevent deterioration in discharge capacity at an initial stage of a charge-discharge cycle.

DESCRIPTION OF EMBODIMENTS

1. Method for Producing Electrode

Figure 1:
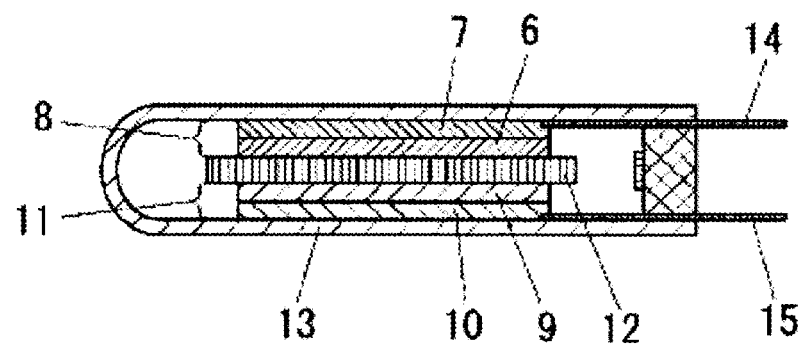
FIG. 1 is a cross-sectional view representing a battery according to one exemplary embodiment.

A method for producing a negative electrode of one exemplary embodiment includes a step of subjecting a copper foil to a plasma treatment, a step of coating the copper foil subjected to the plasma treatment, with a slurry including an active material containing a silicon atom, and a step of subjecting the copper foil coated with the slurry to a heat treatment to form an intermetallic compound of copper and silicon at an interface between the copper foil and the active material.

In general, strong interaction does not occur between a copper foil as a current collector and a silicon atom in an active material. Therefore, in a relevant battery provided with a negative electrode including the copper foil and the active material containing a silicon atom, the active material is expanded and thus easily peeled from the copper foil, and the electrode resistance is increased to cause a reduction in electrode capacity at an initial stage of a charge-discharge cycle.

On the other hand, in the method for producing an electrode of the present exemplary embodiment, a copper foil is subjected to a plasma treatment, and thus an intermetallic bond of copper on the surface of the copper foil is disconnected and the copper foil is activated. Thus, an interface between the copper foil and the active material makes a state easily forming an intermetallic compound at in a subsequent heat treatment. Thereafter, the copper foil is coated with a slurry including a silicon atom and then subjected to the heat treatment, and thus a particle of an intermetallic compound of copper and silicon (for example, silicide ($Cu_5Si$)) is formed on the surface of the copper foil. Interaction then occurs between a copper atom present at the interface of the intermetallic compound particle and a copper atom forming the copper foil, and between a silicon atom present at the interface of the intermetallic compound particle and a silicon atom constituting the active material. Such interaction allows adhesiveness between the active material and the copper foil to be enhanced, even if the active material is expanded along with charge-discharge at an initial stage of a charge-discharge cycle. Accordingly, separation of the active material from the copper foil can be suppressed and an increase in electrode resistance can be suppressed to thereby suppress a reduction in electrode capacity that is caused at an initial stage of a charge-discharge cycle. Herein, the intermetallic compound and copper silicide can be identified by a known atomic composition analysis method.

The active material containing a silicon atom is not particularly limited as long as it contains a silicon atom, and is preferably at least one material selected from the group consisting of silicon (Si) and silicon oxide ($SiO_2$). The active material also includes a composite of silicon and silicon oxide. In such a case, the intermetallic compound formed between the copper foil and the active material is preferably copper silicide. Herein, the composite of silicon and silicon oxide represents a mixture of silicon and silicon oxide or a compound of silicon and silicon oxide.

The gas for the plasma treatment is not particularly limited, and a mixed gas containing argon and ammonia is preferably used during at least a part of plasma irradiation. When an ammonia gas is used as the gas for the plasma treatment, copper nitride can be produced as a reaction intermediate to allow a subsequent silicidation reaction to easily proceed.

The flow rate ratio of argon and ammonia in the mixed gas, argon/ammonia, is preferably 2 to 5. A flow rate ratio of 2 or more can promote the silicidation reaction to effectively form copper silicide. Herein, when the flow rate ratio is 2 or more, the time of the plasma treatment of the copper foil is preferably 30 seconds or more. In addition, a flow rate ratio of 5 or less can prevent a nitridation reaction of copper from excessively proceeding to inversely suppress the silicidation reaction. The flow rate ratio is more preferably 4.

The condition of the plasma treatment of the copper foil is not particularly limited, and the condition is preferable in which the flow rate of the gas for the plasma treatment is 200 to 300 sccm, the plasma output voltage is 1 to 5 kW, and the distance between the plasma source and the copper foil is 10 to 30 mm. The condition of the plasma treatment can be set in the above ranges to thereby prevent silicidation of copper from excessively proceeding, to more effectively suppress an increase in electrode resistance.

Specific examples of the condition of the plasma treatment can include a condition in which plasma is generated in an argon gas and held for about 5 seconds, and thereafter plasma irradiation is conducted in a mixed gas of argon and ammonia, satisfying argon/ammonia=4, for about 30 seconds. In addition, examples can include a condition in which the flow rate of the mixed gas is 250 sccm, the plasma output voltage is 1 to 5 kW, and the distance between the plasma source and the copper foil is 20 mm.

After plasma irradiation of the copper foil, the time taken until the start of coating the slurry containing the active material on the copper foil is preferably 2 seconds or less. A configuration is more preferable in which a plasma generator and a die for slurry coating are integrated, and it is preferable that the copper foil be started to be coated with the active material within a very short time after plasma irradiation of the copper foil. The copper foil coated with the slurry can be held by a drum holder to thereby allow plasma irradiation and slurry coating to be continuously performed. In order to prevent the surface of the copper foil activated by the plasma treatment from being oxidized by oxygen in air, it is desirable to perform slurry coating under an atmosphere of an inert gas such as nitrogen, and it is desirable to use the slurry by itself subjected to degassing or purging with nitrogen.

The coating film thickness of the slurry with which the copper foil is coated, and the electrode density are not required to be particularly limited in terms of the formation reaction of the intermetallic compound. In consideration of warpage of the copper foil in the heat treatment and expansion of the active material in the course of a charge-discharge cycle, however, the basis weight with respect to the film thickness of the slurry, and the electrode density are desirably 5 to 20 mg/cm$^2$ and 0.5 to 2.0 g/cm$^3$, respectively.

The condition of the heat treatment of the copper foil coated with the slurry is not particularly limited, and can include a condition in which the temperature is 250 to 330° C. and the heating time is 30 minutes to 2 hours. If the heating temperature exceeds 330° C., a reaction of copper and silicon may excessively proceed to form a compound having a ratio of a copper atom to a silicon atom of more than 5. In this case, the amount of a silicon atom to be converted to an intermetallic compound not contributing to intercalation of lithium, of a silicon atom that can serves as the active material, may be drastically increased to decrease the effect of suppressing a reduction in electrode capacity at an initial stage of a charge-discharge cycle. On the other hand, if the heating temperature is lower than 250° C., a silicidation reaction of copper may unfavorably proceed not to sufficiently form copper silicide as the intermetallic compound. In addition, even if the heating temperature is set to 250 to 330° C., a shorter heating time may cause copper silicide Cu$_5$Si to be insufficiently formed, and cause adhesiveness between the copper foil and the active material to be insufficiently enhanced. On the other hand, a longer heating time may cause formation of copper silicide Cu$_5$Si to excessively proceed to reduce the amount of Si that can serve as the active material, of Si in the active material, thereby decreasing the effect of suppressing a reduction in electrode capacity at an initial stage of a charge-discharge cycle. Therefore, the heating time is preferably 30 minutes to 2 hours.

A specific production example of the negative electrode includes the following. A composition which includes a negative electrode active material capable of storing and releasing lithium such as silicon (Si), silicon oxide (SiO$_2$), or a composite of silicon and silicon oxide; carbon as a conductivity imparting material; and a binder is prepared. The composition is dispersed in solvent such as N-methyl-2-pyrrolidone (NMP) and kneaded to provide a slurry, and the slurry is coated on a copper foil and the resultant is subjected to a rolling process of producing a coating type electrode plate or to a direct pressing process of a pressure-molded electrode plate, to form a negative electrode active material layer having a well-known form. More specifically, immediately after the copper foil is subjected to a plasma treatment in a mixed gas of ammonia and argon, the copper foil is coated with the above slurry and thereafter fired in a furnace at a temperature in the range from 250 to 330° C. for 1 hour to thereby form a negative electrode. A negative electrode can be produced in the above condition to thereby form an intermetallic compound of copper and silicon (for example, copper silicide) at an interface between the copper foil and the negative electrode active material.

2. Battery

A battery of one exemplary embodiment includes a negative electrode that includes a copper foil, an active material layer including an active material containing a silicon atom on the copper foil, and copper silicide at an interface between the copper foil and the active material. In the negative electrode constituting the battery of the present exemplary embodiment, interaction occurs between a copper atom present at the interface of the copper silicide particle and a copper atom constituting the copper foil, and between a silicon atom present at the interface of the copper silicide particle and a silicon atom forming the active material. Such interaction allows adhesiveness between the active material and the copper foil to be enhanced, even if the active material is expanded along with charge-discharge at an initial stage of a charge-discharge cycle. Accordingly, separation of the active material from the copper foil can be suppressed and an increase in electrode resistance can be suppressed to thereby suppress a reduction in electrode capacity that is caused at an initial stage of a charge-discharge cycle.

The negative electrode preferably further includes a binder and a conductivity imparting material. The discharge capacity of the battery can be thus further enhanced. Examples of the binder can include a binding agent having thermosetting properties represented by polyimide, polyamide, polyamidimide, a polyacrylic acid-based resin and a polymethacrylic acid-based resin. As the conductivity imparting material, a conductive substance such as carbon black, graphite or Ketjen black can be used.

Figure 2:
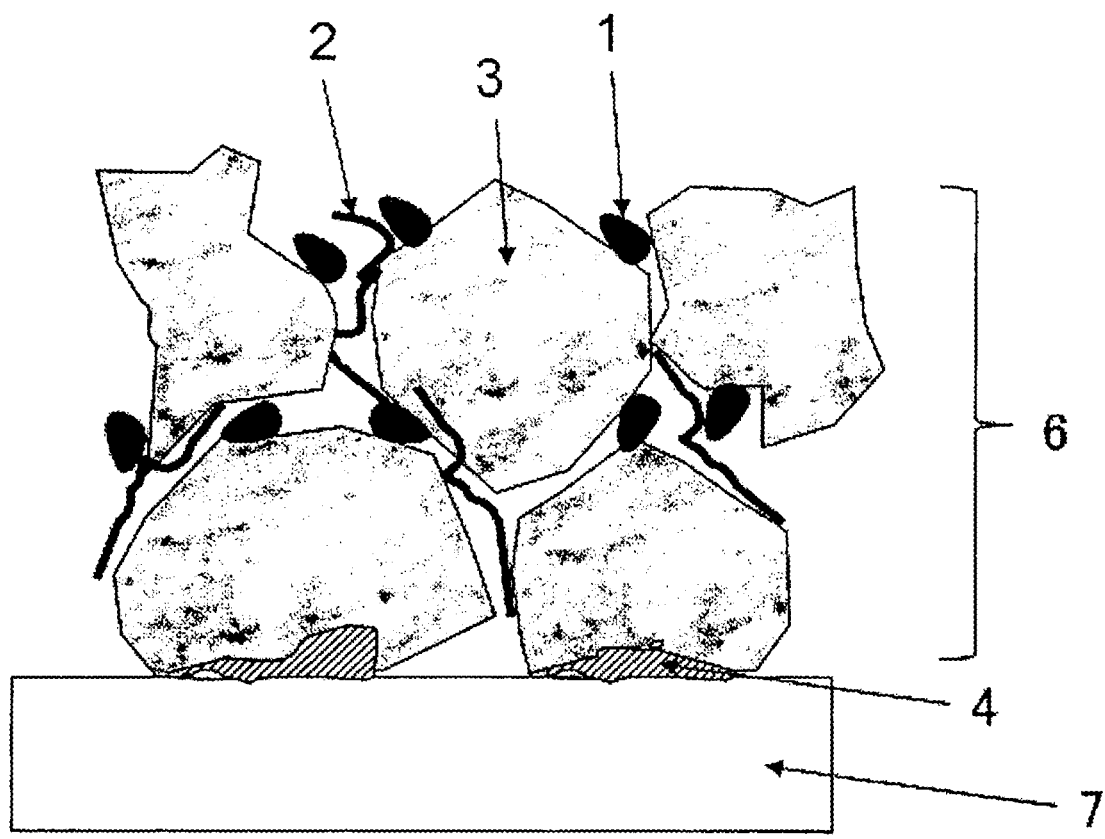
FIG. 2 is a cross-sectional view representing the vicinity of an interface between a copper foil and a negative electrode active material layer in the battery in FIG. 1.

FIGS. 1 and 2 are each a cross-sectional view illustrating one example of a lithium ion secondary battery according to the present exemplary embodiment, and FIG. 1 represents a cross-sectional view of the entire battery and FIG. 2 represents a cross-sectional view of the vicinity of a negative electrode current collector 7 and a silicon particle 3 as the negative electrode active material. As illustrated in FIGS. 1 and 2, in the lithium ion secondary battery of the present exemplary embodiment, a negative electrode 8 including a negative electrode active material layer 6 formed on a negative electrode current collector 7 made of a copper foil, and a positive electrode 11 including a positive electrode active material layer 9 formed on a positive electrode current collector 10 such as an aluminum foil are oppositely arranged with a separator 12 interposed therebetween. A porous film of a polyolefin such as polypropylene or polyethylene, a fluororesin, or the like can be used for the separator 12. A negative electrode lead tab 14 and a positive electrode lead tab 15 for taking out an electrode terminal are withdrawn from the negative electrode 8 and the positive electrode 11, respectively, and are packaged by a packaging film 13 such as a laminate film, except for the respective tips thereof.

As illustrated in FIG. 2, the negative electrode active material layer 6 is provided on the negative electrode current collector (copper foil) 7. The negative electrode active material layer 6 contains a conductivity imparting material 1, a binder 2, and the silicon particle 3 as the negative electrode active material. Copper silicide (Cu$_5$Si) 4 as the intermetallic compound is present between the silicon particle 3 and the negative electrode current collector 7.

EXAMPLES

Next, the present invention is specifically described with reference to Examples and Comparative Examples. The present invention is not limited to the following Examples, without departing from the gist thereof.

Examples 1 to 14 and Comparative Example 1

First, a copper foil was subjected to a plasma treatment by plasma irradiation. The plasma irradiation apparatus in this case may be any apparatus that generates plasma in a general atmospheric pressure environment, and it is desirable in the case of using a mixed gas of ammonia and an argon gas to generate plasma in an air curtain so that a negative pressure relative to a general atmospheric pressure is applied. The plasma treatment method was as follows. The distance between the plasma source and the foil was set to 20 mm, and the foil was first irradiated with plasma at each output power/temperature shown in Table 1 below in an atmosphere, in which only argon was allowed to flow at a flow rate of 200 sccm, for 5 seconds. Thereafter, while the plasma irradiation condition was kept, the argon gas was continuously switched to a mixed gas of argon and ammonia, and plasma irradiation was continued.

Herein, the numerical values described in the columns "Flow rate of Ar", "Flow rate of $NH_3$" and "Plasma irradiation time" in the following Table 1 show conditions in which the plasma treatment was performed under a mixed gas of argon and ammonia.

TABLE 1

|  | Flow rate of Ar (sccm) | Flow rate of $NH_3$ (sccm) | Plasma irradiation time (sec) | Plasma output power (kW) | Temperature of copper foil (° C.) |
|---|---|---|---|---|---|
| Example 1 | 200 | 50 | 30 | 3.0 | 300 |
| Example 2 | 160 | 80 | 30 | 3.0 | 300 |
| Example 3 | 125 | 125 | 30 | 3.0 | 300 |
| Example 4 | 200 | 0 | 30 | 3.0 | 300 |
| Example 5 | 200 | 50 | 10 | 3.0 | 300 |
| Example 6 | 200 | 50 | 30 | 0.5 | 300 |
| Example 7 | 200 | 50 | 30 | 1.0 | 300 |
| Example 8 | 200 | 50 | 30 | 2.0 | 300 |
| Example 9 | 200 | 50 | 30 | 5.0 | 300 |
| Example 10 | 200 | 50 | 30 | 8.0 | 300 |
| Example 11 | 200 | 50 | 30 | 3.0 | 200 |
| Example 12 | 200 | 50 | 30 | 3.0 | 250 |
| Example 13 | 200 | 50 | 30 | 3.0 | 330 |
| Example 14 | 200 | 50 | 30 | 3.0 | 350 |

A carbon composite substance particle with a mass ratio of silicon (Si):silicon oxide ($SiO_2$):carbon=1:1:0.08 (silicon and silicon oxide serving as an active material, carbon serving as a conductivity imparting material) was prepared. Next, polyimide as a binder was mixed therewith so that the mass ratio thereof was 5% based on the total mass of the carbon composite substance particle and the binder. Thereafter, a slurry in which 90 parts of NMP as a solvent was mixed in the mass ratio based on 100 parts of the total mass of the carbon composite substance particle and the binder was adjusted, the slurry was extruded from a die, and the copper foil subjected to plasma irradiation was coated therewith. The coating film thickness of the slurry here was set to 10 mg/cm². Next, a drying treatment was performed at 125° C. for 5 minutes, and thereafter compression molding was performed using a roll press so that the electrode density was 1.0 g/cm³, to produce a negative electrode active material layer. It was confirmed that copper silicide as the intermetallic compound of copper and silicon was formed at the interface between the copper foil and the carbon composite substance particle produced as described above.

In Comparative Example 1, the plasma treatment was not performed at all, the copper foil was coated with the slurry and subjected to a drying treatment at 125° C. for 5 minutes, and thereafter compression molding was performed using a roll press so that the electrode density was 1.0 g/cm³. Next, the drying treatment was again performed in a drying furnace at 330° C. for 30 minutes in a $N_2$ atmosphere, to produce a negative electrode active material layer.

Next, the negative electrode active material layer formed on the copper foil as described above was punched to a size of 3.0×3.0 cm² to provide a negative electrode, and a negative electrode lead tab made of nickel for taking out charge was fused to the negative electrode by an ultrasonic wave.

With respect to a positive electrode active material layer, an active material particle made of lithium nickelate, acetylene black as a conductivity imparting material, and polyvinylidene fluoride as a binder were mixed in a mixing ratio of 92% by mass, 4% by mass, and 4% by mass, respectively. With 100 parts by mass of the mixture was mixed 60 parts by mass of NMP as a solvent to provide a composition. Next, a 20-μm aluminum foil was coated with the composition, thereafter subjected to a heating treatment at 125° C. for 5 minutes, and further roll-pressed to produce a positive electrode active material layer. The positive electrode active material layer formed on the aluminum foil was punched to a size of 2.9×2.9 cm² to provide a positive electrode, and a positive electrode lead tab made of aluminum for taking out charge was fused to the positive electrode by an ultrasonic wave.

Next, the negative electrode, a separator and the positive electrode were stacked in this order so that the negative electrode active material layer and the positive electrode active material layer each faced the separator, and thereafter the resulting cell stack was covered with a laminate film. An electrolytic solution was injected into the cell stack, and sealed under vacuum to thereby produce a film-packaged cell-stacking non-aqueous electrolyte secondary battery using the laminate film. Herein, a solution of 1 mol/L $LiPF_6$ in a mixed solvent of ethylene carbonate (EC), diethyl carbonate (DEC) and ethyl methyl carbonate (EMC) in a volume ratio of 3:5:2 was used for the electrolytic solution.

Each battery produced by the above method was maintained in an environment of 45° C. for 21 days, and thereafter subjected to a charge-discharge test at a constant current of 15 mA, a charge termination voltage of 4.2 V and a discharge termination voltage of 2.5 V. The discharge capacity per weight of the negative electrode active material after 10 cycles is shown in Table 2 below.

TABLE 2

|  | Discharge capacity per weight of negative electrode active material after 10 cycles (mAh/g) |
|---|---|
| Example 1 | 1726 |
| Example 2 | 1680 |
| Example 3 | 1427 |
| Example 4 | 1518 |
| Example 5 | 1602 |
| Example 6 | 1547 |
| Example 7 | 1633 |
| Example 8 | 1706 |
| Example 9 | 1720 |
| Example 10 | 1587 |
| Example 11 | 1544 |
| Example 12 | 1603 |
| Example 13 | 1651 |
| Example 14 | 1518 |
| Comparative Example 1 | 1541 |

It can be seen from comparison of Examples 1 to 4 with Comparative Example 1 that the mixing ratio of argon and ammonia, which allows the effect of the present invention to be largely exerted, is 4:1 in Example 1. In addition, it can be seen from comparison of Examples 1, 6 to 10 with Comparative Example 1 that there is the optimal plasma output power in the plasma treatment, which allows the effect of the present invention to be largely exerted, and the effect is largely exerted at a plasma output power of 2 to 5 kW as shown in each of Examples 1, 8 and 9 in the condition studied in the present Examples.

It can be seen from comparison of Examples 1, 11 to 14 that there is the optimal range of the temperature in plasma irradiation, which allows the effect of the present invention to be largely exerted, and the largest effect is exerted at around 300° C. as shown in Example 1 in the condition studied in the present Examples.

REFERENCE SIGNS LIST

1 Conductivity imparting material
2 Binder
3 Silicon particle
4 Copper silicide
6 Negative electrode active material layer
7 Negative electrode current collector
8 Negative electrode
9 Positive electrode active material layer
10 Positive electrode current collector
11 Positive electrode
12 Separator
13 Packaging film
14 Negative electrode lead tab
15 Positive electrode lead tab

The invention claimed is:

1. A method for producing a negative electrode, comprising:
    subjecting a copper foil to a plasma treatment,
    coating the copper foil subjected to the plasma treatment, with a slurry comprising an active material containing a silicon atom, and
    subjecting the copper foil coated with the slurry to a heat treatment to form an intermetallic compound of copper and silicon at an interface between the copper foil and the active material.

2. The method for producing a negative electrode according to claim 1, wherein
    the active material comprises at least one material selected from the group consisting of silicon and silicon oxide, and
    the intermetallic compound is copper silicide.

3. The method for producing a negative electrode according to claim 1, wherein
    the plasma treatment is performed using a mixed gas containing argon and ammonia, and
    a flow rate ratio of argon and ammonia in the mixed gas, argon/ammonia, is 2 to 5.

4. The method for producing a negative electrode according to claim 3, wherein the plasma treatment is performed under a condition where a flow rate of the mixed gas is 200 to 300 sccm, a plasma output voltage is 1 to 5 kW, and a distance between a plasma source and the copper foil is 10 to 30 mm.

5. The method for producing a negative electrode according to claim 1, wherein the heat treatment is performed under a condition where a temperature is 250 to 330° C. and a heating time is 30 minutes to 2 hours.

6. A negative electrode comprising:
    a copper foil,
    an active material layer comprising an active material containing a silicon atom and a binder on the copper foil, and
    copper silicide at an interface between the copper foil and the active material.

7. The negative electrode according to claim 6, wherein the active material comprises at least one material selected from the group consisting of silicon and silicon oxide.

8. The negative electrode according to claim 6, further comprising a conductivity imparting material.

9. A battery comprising the negative electrode according to claim 6.

10. The battery according to claim 9, wherein the battery is a lithium ion secondary battery.

11. A battery comprising the negative electrode according to claim 7.

12. The battery according to claim 11, wherein the battery is a lithium ion secondary battery.

13. A battery comprising the negative electrode according to claim 8.

14. The battery according to claim 13, wherein the battery is a lithium ion secondary battery.

15. The negative electrode according to claim 6, wherein the binder is polyimide.

16. The negative electrode according to claim 8, wherein the conductivity imparting material is carbon.

17. A battery comprising the negative electrode according to claim 15.

18. The battery according to claim 17, wherein the battery is a lithium ion secondary battery.

19. A battery comprising the negative electrode according to claim 16.

20. The battery according to claim 19, wherein the battery is a lithium ion secondary battery.

* * * * *